United States Patent
Li et al.

(10) Patent No.: US 11,996,778 B2
(45) Date of Patent: May 28, 2024

(54) CIRCUIT FOR CONTROLLING A SWITCHING MODE POWER SUPPLY AND THE METHOD THEREOF

(71) Applicant: Chengdu Monolithic Power Systems Co., Ltd., Chengdu (CN)

(72) Inventors: Hui Li, Hangzhou (CN); Guangzhuo Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 207 days.

(21) Appl. No.: 17/734,170

(22) Filed: May 2, 2022

(65) Prior Publication Data

US 2022/0368236 A1 Nov. 17, 2022

(30) Foreign Application Priority Data

May 13, 2021 (CN) .......................... 202110523789.9

(51) Int. Cl.
*H02M 3/335* (2006.01)
*H02M 1/00* (2006.01)
*H02M 1/08* (2006.01)

(52) U.S. Cl.
CPC ..... *H02M 3/33515* (2013.01); *H02M 1/0003* (2021.05); *H02M 1/08* (2013.01)

(58) Field of Classification Search
CPC .. H02M 3/33515; H02M 1/0003; H02M 1/08; H02M 1/0032; Y02B 70/10
See application file for complete search history.

(56) References Cited

U.S. PATENT DOCUMENTS

| | | | |
|---|---|---|---|
| 7,679,341 B2 | 3/2010 | Chen | |
| 8,207,714 B2 | 6/2012 | Chen | |
| 8,238,123 B2 | 8/2012 | Zhang et al. | |
| 8,686,703 B2 | 4/2014 | Xi | |
| 9,093,909 B2 | 7/2015 | Wang et al. | |
| 9,362,823 B2 | 6/2016 | Li | |
| 9,641,085 B2 | 5/2017 | Li | |
| 10,164,514 B2 | 1/2018 | Li | |
| 9,891,648 B2 | 2/2018 | Li | |
| 10,666,272 B2* | 5/2020 | Li | H03L 7/093 |
| 11,855,537 B2* | 12/2023 | Zhang | H02M 1/0032 |
| 2005/0078492 A1* | 4/2005 | Takahashi | H02M 3/33523 363/21.15 |

(Continued)

*Primary Examiner* — Yusef A Ahmed
(74) *Attorney, Agent, or Firm* — Perkins Coie LLP

(57) ABSTRACT

A circuit for controlling a switching mode power supply having a power switch, having: a feedback pulse circuit, configured to receive a feedback signal, and to provide a feedback pulse signal; a load determining circuit, configured to receive the feedback signal, and to provide a load determining signal; a light load pulse circuit, configured to receive the load determining signal and a frequency regulating signal, and to provide a light load pulse signal; a frequency regulating circuit, configured to receive the load determining signal, the light load pulse signal and a normal load pulse signal, and to provide the frequency regulating signal; and a selecting circuit, configured to receive the load determining signal, the feedback pulse signal and the light load pulse signal, and to provide an on control signal and the normal load pulse signal; wherein the on control signal controls an on operation of the power switch.

8 Claims, 6 Drawing Sheets

(56) References Cited

U.S. PATENT DOCUMENTS

| | | | | |
|---|---|---|---|---|
| 2008/0130324 A1* | 6/2008 | Choi | H02M 3/33507 | 363/21.03 |
| 2008/0180078 A1* | 7/2008 | Hiasa | H02M 3/33507 | 323/282 |
| 2009/0091304 A1* | 4/2009 | Yang | H02M 3/1584 | 323/242 |
| 2010/0061129 A1* | 3/2010 | Fujii | H02M 3/33523 | 363/127 |
| 2010/0208500 A1* | 8/2010 | Yan | H02M 3/33523 | 363/21.12 |
| 2011/0007526 A1* | 1/2011 | Zhang | H02M 3/1563 | 363/21.02 |
| 2011/0084677 A1* | 4/2011 | Shi | H02M 3/33507 | 323/284 |
| 2011/0228570 A1 | 9/2011 | Li | | |
| 2013/0027985 A1* | 1/2013 | Wang | H02M 3/33507 | 363/21.01 |
| 2014/0016373 A1* | 1/2014 | Zhang | H02M 3/33507 | 363/21.15 |
| 2014/0035654 A1* | 2/2014 | Jiang | H03K 17/16 | 327/365 |
| 2014/0043002 A1* | 2/2014 | Chung | H02M 1/08 | 323/283 |
| 2014/0049235 A1* | 2/2014 | Li | H02M 3/156 | 323/271 |
| 2014/0084885 A1* | 3/2014 | Ouyang | H02M 3/158 | 323/271 |
| 2014/0160601 A1* | 6/2014 | Ouyang | H02M 3/1588 | 361/18 |
| 2014/0177290 A1* | 6/2014 | Zhang | H02M 3/33507 | 363/21.13 |
| 2017/0085185 A1* | 3/2017 | Wang | H02M 1/08 | |
| 2017/0366090 A1* | 12/2017 | Sugawara | H02M 3/156 | |
| 2018/0131379 A1* | 5/2018 | Li | H03K 5/24 | |
| 2018/0269783 A1* | 9/2018 | Yin | H02M 1/0043 | |
| 2018/0351464 A1* | 12/2018 | Finkel | H02M 3/33507 | |
| 2022/0045607 A1* | 2/2022 | Li | H02M 1/0032 | |
| 2022/0190722 A1* | 6/2022 | Zhang | H02M 1/0032 | |

* cited by examiner

CIRCUIT FOR CONTROLLING A SWITCHING MODE POWER SUPPLY AND THE METHOD THEREOF

CROSS-REFERENCE TO RELATED APPLICATIONS

This application claims priority to and the benefit of Chinese Patent Application No. 202110523789.9, filed on May 13, 2021, which is incorporated herein by reference in its entirety.

FIELD

The present invention relates generally to electronic circuits, and more particularly but not exclusively to a control circuit for an isolated switching mode power supply and the method thereof.

BACKGROUND

FIG. 1 schematically shows a typical isolated switching mode power supply, i.e., a flyback converter 10. As shown in FIG. 1, the flyback converter 10 comprises a transformer T1, a primary side circuit comprising a power switch PM1 and a primary control circuit 101, and a secondary side circuit comprising a diode D1 and an output capacitor Co, wherein the primary side circuit and the secondary side circuit are isolated by the transformer T1. The transformer T1 comprises a primary winding Lp receiving an input voltage Vi, and a second winding Ls providing an output voltage Vo to a load. The primary control circuit 101 controls the power switch PM1 to transfer energy from the primary side circuit to the secondary side circuit to power the load, based on a feedback voltage Vfb indicating output information of the flyback converter 10.

Isolators like optocoupler for feeding back the feedback voltage Vfb from the secondary side to the primary side is removed in the primary controlled flyback converter 10 in FIG. 1 for saving cost, and then the feedback voltage Vfb is obtained indirectly, which brings in imprecision. In this case, the flyback converter 10 may not be able to enter a light load working mode timely, resulting in low efficiency during light load working mode.

In addition, to achieve low power dissipation during light load working mode or no load mode, the prior art flyback converter usually decreases a switching frequency of the power switch PM1 to a very low level. However, low switching frequency makes the loop compensation for the whole circuit system difficult, and also may introduce unwanted audible noise.

SUMMARY

It is an object of the present invention to provide a circuit for controlling a switching mode power supply smoothly switch between a normal working mode and a light load working mode, and meanwhile to avoid audible noise and simplify the loop compensation design of the switching mode power supply by controlling the switching frequency under light load working mode.

In accomplishing the above and other objects, there has been provided, in accordance with an embodiment of the present invention, a control circuit of a switching mode power supply having a power switch, comprising: a feedback pulse circuit, configured to receive a feedback signal indicative of a load of the switching mode power supply, and to provide a feedback pulse signal based on the feedback signal; a load determining circuit, configured to receive the feedback signal, and to provide a load determining signal based on the feedback signal; a light load pulse circuit, configured to receive the load determining signal and a frequency regulating signal, and to provide a light load pulse signal based on the load determining signal and the frequency regulating signal; and a selecting circuit, configured to receive the load determining signal, the feedback pulse signal and the light load pulse signal, and to provide an on control signal based on the load determining signal, the feedback pulse signal and the light load pulse signal; wherein the on control signal controls an on operation of the power switch.

In accomplishing the above and other objects, there has been provided, in accordance with an embodiment of the present invention, a switching mode power supply, comprising: a power switch; a control circuit, configured to provide an on control signal for controlling an on operation of the power switch, wherein the control circuit comprises: a feedback pulse circuit, configured to receive a feedback signal indicative of a load of the switching mode power supply, and to provide a feedback pulse signal based on the feedback signal; a load determining circuit, configured to receive the feedback signal, and to provide a load determining signal based on the feedback signal; a light load pulse circuit, configured to receive the load determining signal and a frequency regulating signal, and to provide a light load pulse signal based on the load determining signal and the frequency regulating signal; and a selecting circuit, configured to receive the load determining signal, the feedback pulse signal and the light load pulse signal, and to provide the on control signal based on the load determining signal, the feedback pulse signal and the light load pulse signal.

In accomplishing the above and other objects, there has been provided, in accordance with an embodiment of the present invention, a control method for controlling a switching mode power supply, comprising: generating a feedback pulse signal based on a feedback signal indicative of a load of the switching mode power supply, wherein a frequency of the feedback pulse signal is proportional to a value of the feedback signal; generating a light load pulse signal, wherein a frequency of the light load pulse signal decreases when the switching mode power supply enters a light load working mode; generating a load determining signal based on the feedback signal, wherein when the feedback signal is lower than an enter-light-load mode threshold, the load determining signal indicates that the switching mode power supply works under the light load working mode, and when the feedback signal is larger than an exit-light-load mode threshold, the load determining signal indicates that the switching mode power supply works under a normal working mode; and generating an on control signal based on the light load pulse signal and the feedback pulse signal, to control an on operation of the power switch.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

Figure 1:
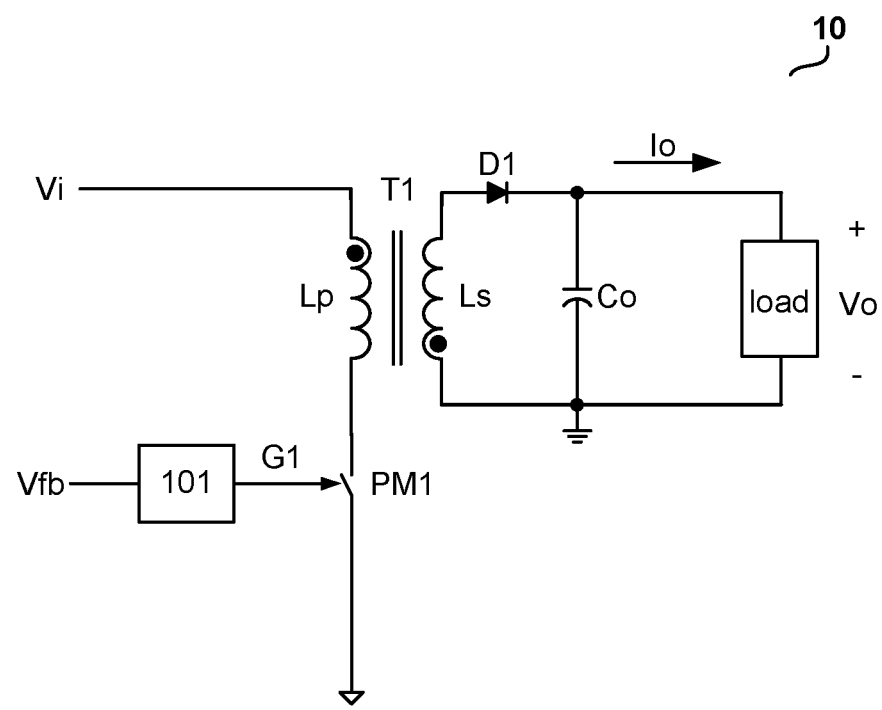
FIG. 1 schematically shows a prior art isolated switching mode power supply 10.
Figure 2:
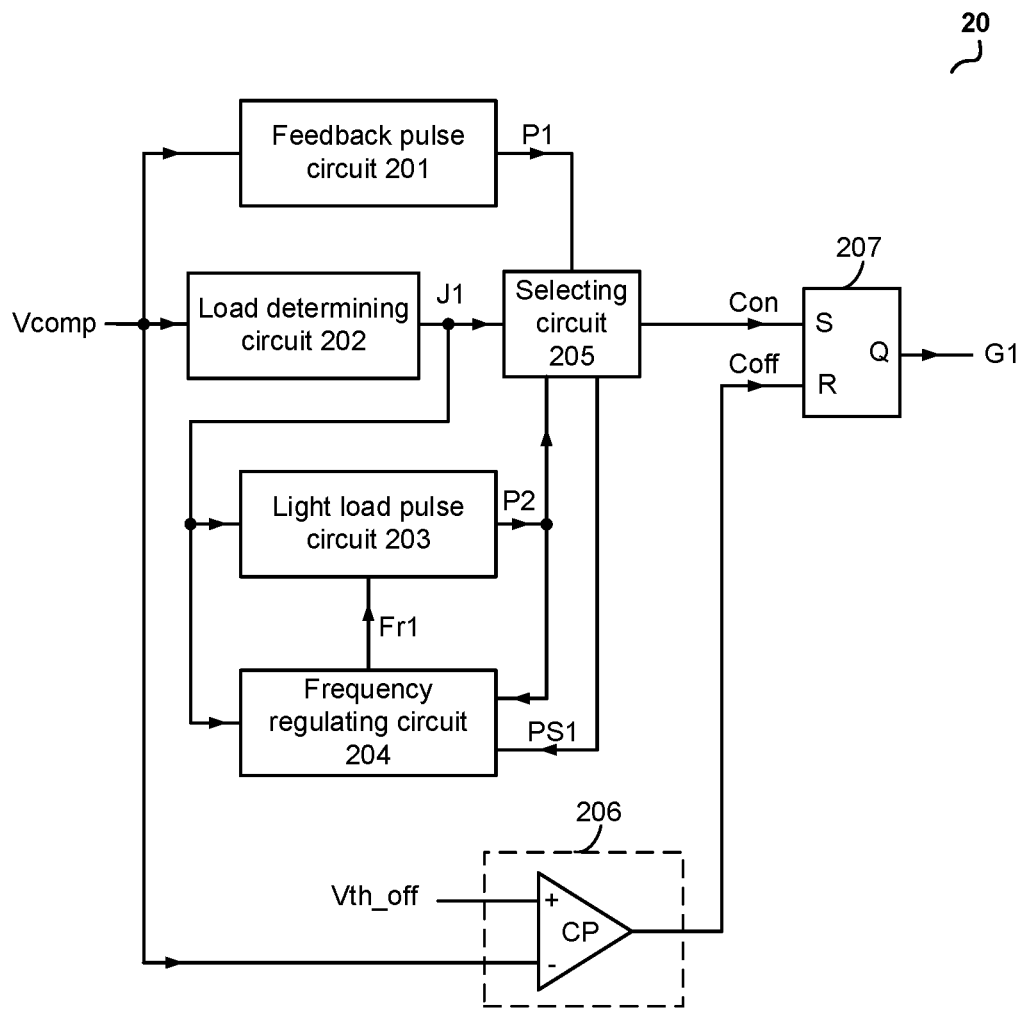
FIG. 2 schematically shows a control circuit 20 of a switching mode power supply in accordance with an embodiment of the present invention.

FIG. 2 schematically shows a control circuit 20 of a switching mode power supply in accordance with an embodiment of the present invention. The control circuit 20 may be used with the flyback converter 10 in FIG. 1, and also could be used with switching mode power supplies having other topologies, like buck converter, boost converter, buck-boost converter, etc. As shown in FIG. 2, the control circuit 20 comprises a feedback pulse circuit 201, a load determining circuit 202, a light load pulse circuit 203, a frequency regulating circuit 204 and a selecting circuit 205. The feedback pulse circuit 201 is configured to receive a feedback signal Vcomp, and to provide a feedback pulse signal P1 based on the feedback signal Vcomp. The load determining circuit 202 is configured to receive the feedback signal Vcomp, and to provide a load determining signal J1 based on the feedback signal Vcomp. The light load pulse circuit 203 is configured to receive the load determining signal J1 and a frequency regulating signal Fr1, and to provide a light load pulse signal P2 based on the load determining signal J1 and the frequency regulating signal Fr1. The frequency regulating circuit 204 is configured to receive the load determining signal J1, the light load pulse signal P2 and a normal load pulse signal PS1, wherein based on the load determining signal J1, the light load pulse signal P2 and the normal load pulse signal PS1, the frequency regulating circuit 204 provides the frequency regulating signal Fr1. The selecting circuit 205 is configured to receive the load determining signal J1, the feedback pulse signal P1 and the light load pulse signal P2, wherein based on the load determining signal J1, the feedback pulse signal P1 and the light load pulse signal P2, the selecting circuit 205 provides an on control signal Con and the normal load pulse signal PS1. In the embodiment of FIG. 2, the control circuit 20 further comprises an off control circuit 206 and a driving logic circuit 207. The off control circuit 206 is configured to receive the feedback signal Vcomp and an off threshold signal Vth_off, and based on the feedback signal Vcomp and the off threshold signal Vth_off, the off control circuit 206 provides an off control signal Coff. The driving logic circuit 207, configured to receive the on control signal Con and the off control signal Coff, and based on the on control signal Con and the off control signal Coff, the driving logic circuit 207 provides a power control signal G1, for controlling the power switch PM1 shown in FIG. 1.

In the embodiments of the present invention, when the load is light, the switching mode power supply, like the flyback converter 10 in FIG. 1, works under light load working mode, otherwise, the switching mode power supply works under normal working mode. The feedback signal Vcomp indicates the load condition. In one embodiment, the feedback signal Vcomp is an amplified error between the output voltage Vo and a reference voltage, or an amplified error between partial of the output voltage Vo and the reference voltage. In one embodiment, the feedback signal Vcomp increases as the load increases, and decreases as the load decreases. In some embodiments, the feedback signal Vcomp may be inversely proportional to the load.

In one embodiment, the feedback pulse circuit 201 is a voltage-frequency converting circuit. The feedback pulse circuit 201 provides the feedback pulse signal P1 having a frequency proportional to a voltage of the feedback signal Vcomp. In one embodiment, the larger the voltage of the feedback signal Vcomp, the higher the frequency of the feedback pulse signal P1.

In the control circuit 20, the load determining circuit 202 provides the load determining signal J1 based on the voltage of the feedback signal Vcomp to indicate the load condition. The selecting circuit 205 receives the load determining signal J1. When the load determining signal J1 indicates that the load is normal, the feedback pulse signal P1 is selected to be the on control signal Con, otherwise, the light load pulse signal P2 is selected to be the on control signal Con.

In the present invention, the normal load condition and the light load condition are determined according to the application. Persons of ordinary skill in the art could set a load threshold, and then define the normal load condition when the load is larger than the load threshold, and define the light load condition when the load is smaller than the load threshold. Meanwhile, the normal working mode corresponds to a working state of the switching mode power supply under normal load condition, and the light load working mode corresponds to a working state of the switching mode power supply under light load condition.

The light load pulse signal P2 provided by the light load pulse circuit 203 has a preset frequency. In some embodiments, the frequency of the light load pulse signal P2 is controlled to be lower than the lower limit of the audible noise range, i.e., 20 Hz. Under light load working mode, the frequency regulating signal Fr1 regulates the frequency of the light load pulse signal P2, to make the frequency of the light load pulse signal P2 decrease or increase from the preset value to an optimum value under the current load condition.

When the load determining signal J1 indicates the normal load condition, the feedback pulse signal P1 is provided to be the normal load pulse signal PS1, and is then selected to be the on control signal Con. Under light load working mode, the light load pulse signal P2 is selected to be the on control signal. Under a critical load condition between the normal load condition and the light load condition, the switching mode power supply may enter and exit the light load working mode frequently, and accordingly, the light load pulse signal P2 changes frequently, since every time the switching mode power supply enters the light load working mode, the frequency of the light load pulse signal P2 either decreases or increases from the preset value. To prevent the frequent change of the frequency of the light load pulse signal P2, the normal load pulse signal PS1 is adopted by the frequency regulating circuit 204 to keep the frequency regulating signal Fr1 unchanged, so as to fix the frequency of the light load pulse signal P2. In some embodiments, the load determining signal J1, instead of the normal load pulse signal PS1, is adopted to control the frequency regulating circuit 204.

In the embodiment of FIG. 2, the off control circuit 206 comprises a comparator. The comparator receives the off threshold signal Vth_off and the feedback signal Vcomp, and provides the off control signal Coff to control the off operation of the power switch PM1 based on a comparison result of the off threshold signal Vth_off and the feedback signal Vcomp. It should be understood that the feedback signal Vcomp could be replaced by other signals associated with the load, e.g., a load current indicating signal, an inductor current signal of the switching mode power supply. Furthermore, in some embodiments, instead of turning off the power switch when the feedback signal Vcomp is lower than the off threshold signal Vth_off, other control methods, like the constant-on-time control, which means the power switch is turned off after being on for a preset time, may be adopted to turn off the power switch PM1.

In one embodiment, the driving logic circuit 207 comprises a RS flip-flop. The RS flip-flop comprises a set terminal "S" (the first input terminal), a reset terminal "R" (the second input terminal) and an output terminal, wherein the set terminal "S" receives the on control signal Con, the reset terminal "R" receives the off control signal Coff, and wherein based on the on control signal Con and the off control signal Coff, the RS flip-flop provides the power control signal G1 at the output terminal. In one embodiment, when the RS flip-flop is set by pulses of the on control signal Con, the power control signal G1 becomes logic high to turn on the power switch PM1. When the RS flip-flop is reset by pulses of the off control signal Coff, the power control signal G1 becomes logic low to turn off the power switch PM1. It should be understood that the logic states (pulse control or level control) of the signals, and the corresponding relationship to the operations of the power switch PM1, are decided by applications, and are not limited by the embodiments of the present invention.

Figure 3:
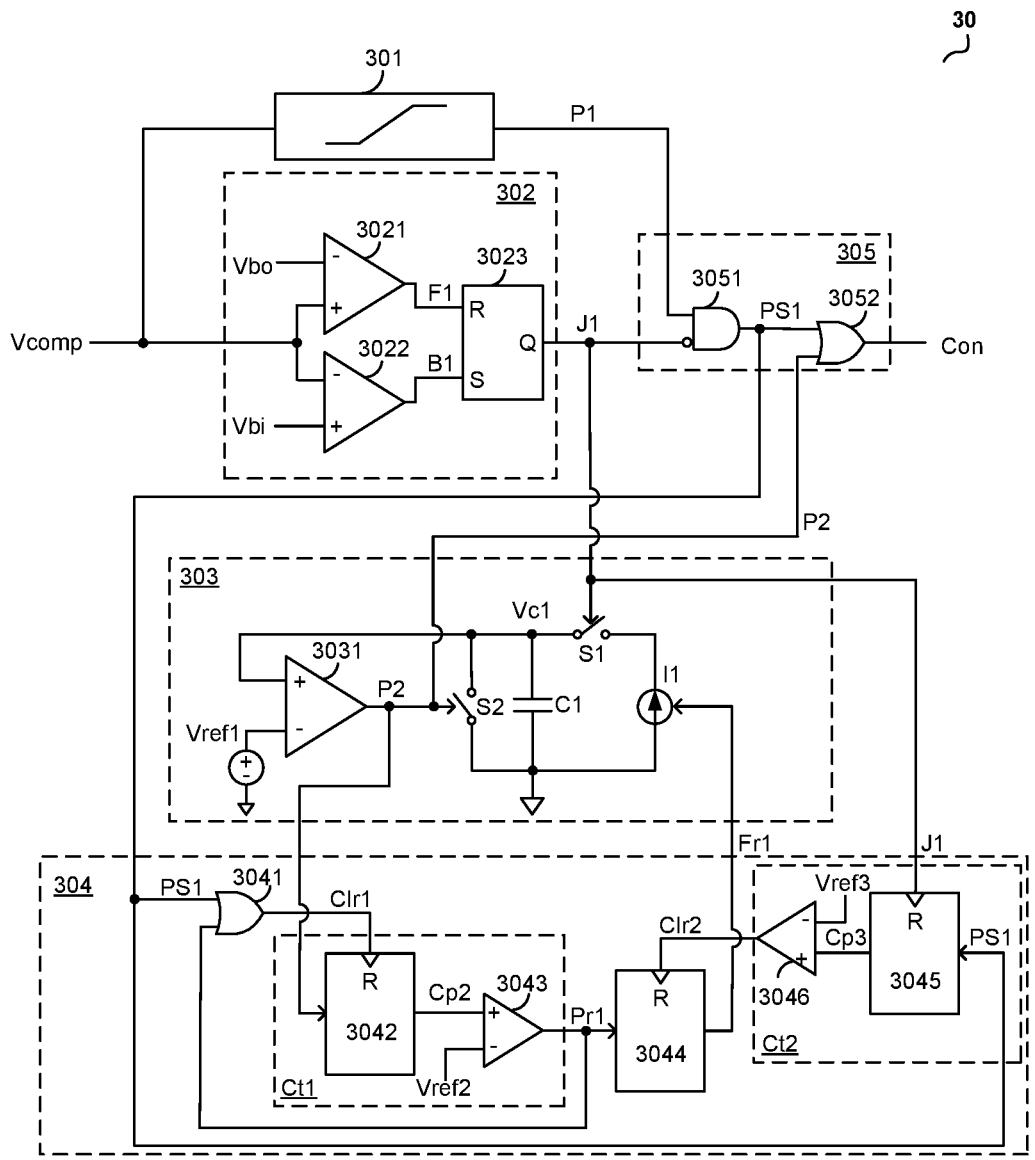
FIG. 3 schematically shows a control circuit 30 of a switching mode power supply in accordance with an embodiment of the present invention.

FIG. 3 schematically shows a control circuit 30 of a switching mode power supply in accordance with an embodiment of the present invention. The control circuit 30 may be used with the flyback converter 10 in FIG. 1, and also could be used with switching mode power supplies having other topologies, like buck converter, boost converter, buck-boost converter, etc. As shown in FIG. 3, the control circuit 30 comprises a feedback pulse circuit 301, a load determining circuit 302, a light load pulse circuit 303, a frequency regulating circuit 304 and a selecting circuit 305. The feedback pulse circuit 301 is configured to receive the feedback signal Vcomp, and to provide the feedback pulse signal P1 based on the feedback signal Vcomp. The load determining circuit 302 is configured to receive the feedback signal Vcomp, and to provide the load determining signal J1 based on the feedback signal Vcomp. The light load pulse circuit 303 is configured to receive the load determining signal J1 and the frequency regulating signal Fr1, and to provide the light load pulse signal P2 based on the load determining signal J1 and the frequency regulating signal Fr1. The frequency regulating circuit 304 is configured to receive the load determining signal J1, the light load pulse signal P2 and the normal load pulse signal PS1, wherein based on the load determining signal J1, the light load pulse signal P2 and the normal load pulse signal PS1, the frequency regulating circuit 304 provides the frequency regulating signal Fr1. The selecting circuit 305 is configured to receive the load determining signal J1, the feedback pulse signal P1 and the light load pulse signal P2, wherein based on the load determining signal J1, the feedback pulse signal P1 and the light load pulse signal P2, the selecting circuit 305 provides the on control signal Con and the normal load pulse signal PS1.

As shown in FIG. 3, the load determining circuit 302 comprises an exit-light-load-mode comparator 3021, an enter-light-load-mode comparator 3022 and a RS flip-flop 3023. The exit-light-load-mode comparator 3021 has a first input terminal configured to receive an exit-light-load-mode threshold Vbo, a second input terminal configured to receive the feedback signal Vcomp, and an output terminal configured to provide an exit-light-load-mode setting signal F1 based on a comparison result of the exit-light-load-mode threshold Vbo and the feedback signal Vcomp. The enter-light-load-mode comparator 3022 has a first input terminal configured to receive the feedback signal Vcomp, a second input terminal configured to receive an enter-light-load-mode threshold Vbi, and an output terminal configured to provide an enter-light-load-mode setting signal B1 based on a comparison result of the enter-light-load-mode threshold Vbi and the feedback signal Vcomp. In one embodiment, the enter-light-load-mode threshold Vbi is lower than the exit-light-load-mode threshold Vbo. The RS flip-flop 3023 has a set terminal "S" (the first input terminal) configured to receive the enter-light-load-mode setting signal B1, a reset terminal "R" (the second input terminal) configured to receive the exit-light-load-mode setting signal F1, and an output terminal "Q" configured to provide the load determining signal J1.

As shown in FIG. 3, the light load pulse circuit 303 comprises a light load pulse comparator 3031, a charging control switch S1, a discharging control switch S2, a capacitor C1 and a current source I1. The light load pulse comparator 3031 has a first input terminal configured to receive a capacitor voltage Vc1 across the capacitor C1, a second input terminal configured to receive a light load pulse reference Vref1, and an output terminal configured to provide the light load pulse signal P2 based on a comparison result of the capacitor voltage Vc1 and the light load pulse reference Vref1. The current source I1 charges the capacitor C1 to build up the capacitor voltage Vc1. The charging control switch S1 is controlled by the load determining signal J1. When the load determining signal J1 indicates a light load condition, the charging control switch S1 is turned on, and then the current source I1 charges the capacitor C1. The discharging control switch S2 is controlled by the light load pulse signal P2. The discharging control switch S2 is turned on by the pulses of the light load pulse signal P2, and then the capacitor C1 is discharged. A charging current of the current source I1 is controlled by the frequency regulating signal Fr1. In one embodiment, the charging current of the current source I1 decreases as the frequency regulating signal Fr1 increases. In other embodiments, the charging current of the current source I1 may increase as the frequency regulating signal Fr1 increases according to the applications.

As shown in FIG. 3, the frequency regulating circuit 304 comprises a logic gate circuit 3041, a first counting control circuit Ct1, a counting circuit 3044 and a second counting control circuit Ct2. In the embodiment of FIG. 3, the logic gate circuit 3041 comprises an OR gate, configured to receive the normal load pulse signal PS1 and a light load pulse regulating signal Pr1, and to provide a first reset signal Clr1 based on an logic OR operation to the normal load pulse signal PS1 and the light load pulse regulating signal Pr1. The first counting control circuit Ct1 receives the first reset signal Clr1 and the light load pulse signal P2, and provides the light load pulse regulating signal Pr1 based on the first reset signal Clr1 and the light load pulse signal P2. The second counting control circuit Ct2 receives the load determining signal J1 and the normal load pulse signal PS1, and provides a second reset signal Clr2 based on the load determining signal J1 and the normal load pulse signal PS1. The counting circuit 3044 has a reset terminal "R" configured to receive the second reset signal Clr2, an input terminal configured to receive the light load pulse regulating signal Pr1, and an output terminal configured to provide the frequency regulating signal Fr1.

In one embodiment, the first counting control circuit Ct1 comprises a counting circuit 3042 and a comparator 3043. The counting circuit 3042 receives the light load pulse signal P2, and provides a light load pulse counting signal Cp2. The comparator 3043 receives the light load pulse counting signal Cp2 and a light load pulse reference Vref2, and provides the light load pulse regulating signal Pr1 based on a comparison result of the light load pulse counting signal Cp2 and the light load pulse reference Vref2. In one embodiment, the comparator 3043 could be a digital comparator. In some embodiments, the comparator 3043 could also be an analog comparator, and then the light load pulse counting signal Cp2 may be converted to an analog signal before provided to the comparator 3043. When the light load pulse counting signal Cp2 reaches the light load pulse reference Vref2, the light load pulse regulating signal Pr1 flips to logic high, and the counting circuit 3044 counts once. The light load pulse regulating signal Pr1 is also provided to reset the counting circuit 3042 through the logic gate circuit 3041. The counting circuit 3044 provides the frequency regulating signal Fr1 based on the light load pulse regulating signal Pr1. In one embodiment, the frequency regulating signal Fr1 decreases once the light load pulse regulating signal Pr1 flips to logic high. That means, when the pulses of the light load pulse signal P2 reaches a number decided by the light load pulse reference Vref2, e.g., 4, the light load pulse regulating signal Pr1 flips to logic high, which causes the frequency regulating signal Fr1 to decrease. Accordingly, the charging current provided by the current source I1 decreases, slowing down the increasing speed of the capacitor voltage Vc1, thereby decreasing the pulse frequency of the light load pulse signal P2. The counting circuit 3042 could also be reset by pulses of the normal load pulse signal PS1. Once the counting circuit 3042 is reset, the light load pulse regulating signal Pr1 and the frequency regulating signal Fr1 remain unchanged, and so is the frequency of the light load pulse signal P2.

In one embodiment, the second counting control circuit Ct2 comprises a counting circuit 3045 and a comparator 3046. The counting circuit 3045 receives the normal load pulse signal PS1, and provides a pulse counting signal Cp3 based on the pulses of the normal load pulse signal PS1. The comparator 3046 receives the pulse counting signal Cp3 and a normal load pulse reference Vref3, and provides the second reset signal Clr2 based on a comparison result of the pulse counting signal Cp3 and the normal load pulse reference Vref3. In one embodiment, the comparator 3046 could be a digital comparator. In some embodiments, the comparator 3046 could also be an analog comparator, and then the light load pulse counting signal Cp3 may be converted to an analog signal before provided to the comparator 3046. In one embodiment, when the pulses of the normal load pulse signal PS1 reaches a number decided by the normal load pulse reference Vref3, e.g., 4, the comparator 3046 flips to output a logic high second reset signal Clr2 to reset the counting circuit 3044.

The counting circuit 3044 provides the frequency regulating signal Fr1 based on the light load pulse regulating signal Pr1, and could be reset by the second reset signal Clr2. When the light load pulse regulating signal Pr1 flips to logic high, the frequency regulating signal Fr1 decreases. When the pulse counting signal Cp3 reaches the normal load pulse reference Vref3, indicating that the switching mode power supply need to exit the light load working mode, the second reset signal Clr2 resets the counting circuit 3044. Then the frequency regulating signal Fr1 returns back to an initial value, and decreases from the initial value next time the switching mode power supply enters the light load working mode.

In the embodiment of FIG. 3, the selecting circuit 305 comprises an AND gate 3051 and an OR gate 3052. The AND gate 3051 receives the feedback pulse signal P1 and the load determining signal J1, and provides the normal load pulse signal PS1. The OR gate 3052 receives the normal load pulse signal PS1 and the light load pulse signal P2, and provides the on control signal Con. In the embodiment of FIG. 3, the load determining signal J1 is inverted before provided to the AND gate 3051. When the load determining signal J1 is logic low, the switching mode power supply needs to exit the light load working mode. Then the inverted load determining signal J1 is logic high, and the feedback pulse signal P1 passes the AND gate 3051 to be the normal load pulse signal PS1. When the load determining signal J1 is logic high, the switching mode power supply needs to enter the light load working mode. Then the inverted load determining signal J1 is logic low, and the feedback pulse signal P1 is blocked by the AND gate 3051. As a result, the normal load pulse signal PS1 keeps logic low. The OR gate 3052 provides the light load pulse signal P2 to be the on control signal Con to control the on operation of the power switch PM1. It should be understood that the signals and the circuits in the embodiment of FIG. 3 are only for illustration. The forms of the signals of the selecting circuit 305 may be changed in some embodiments, and thus the selecting circuit 305 is changed accordingly. For example, when the logic low state of the load determining signal J1 indicates the light load condition, the load determining signal J1 could be provided to the AND gate 3051 directly without inversion.

Figure 4:
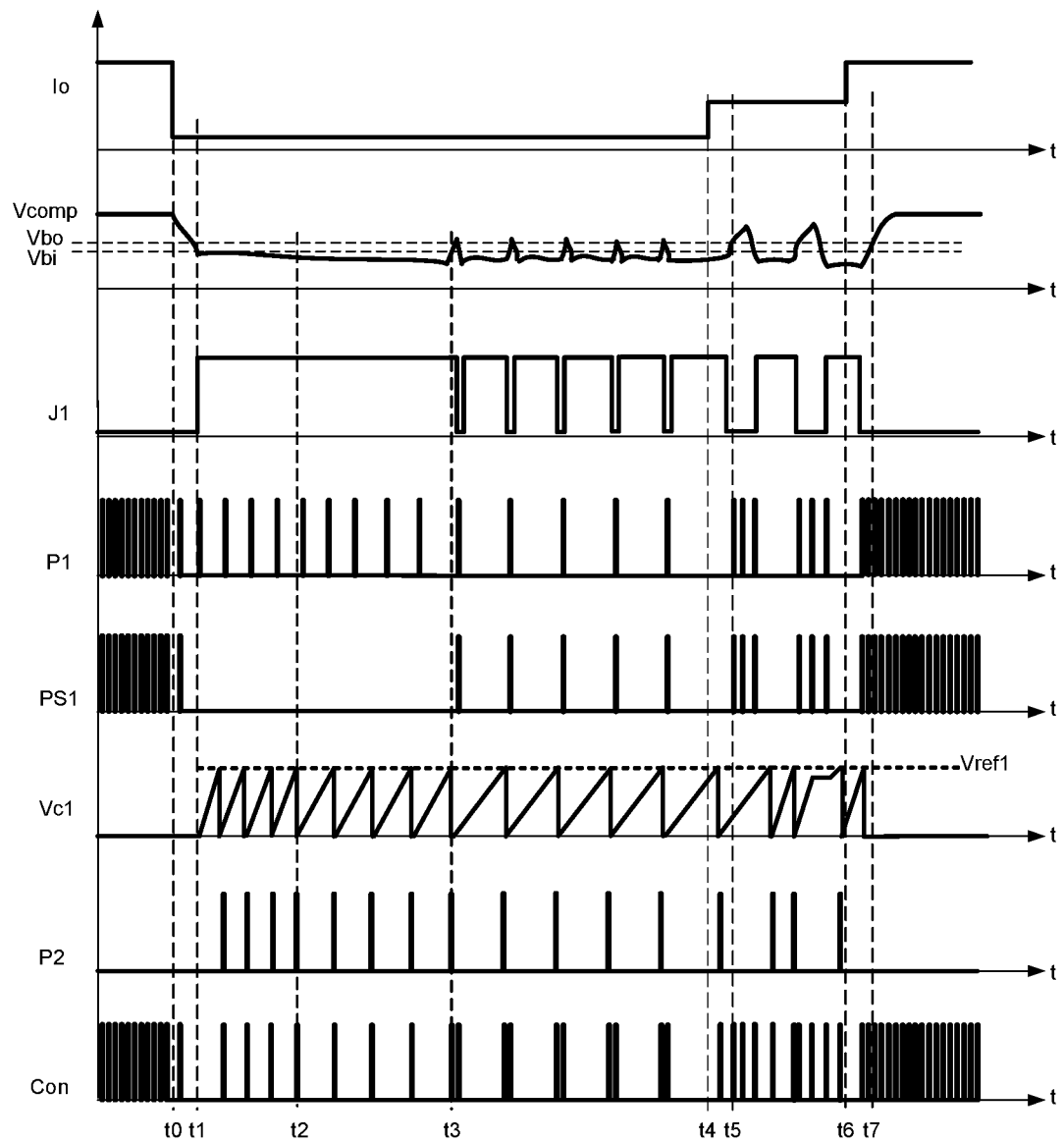
FIG. 4 schematically shows signal waveforms of the control circuit 30 in accordance with an embodiment of the present invention.

FIG. 4 schematically shows signal waveforms of the control circuit 30 in accordance with an embodiment of the present invention, wherein Io represents the output current of the switching mode power supply, i.e., the load current.

The operation of the control circuit 30 in FIG. 3 is illustrated with references to FIGS. 3 and 4. As shown in FIG. 4, at time t0, the output current Io drops, followed by the decreasing of the feedback signal Vcomp. At time t1, the feedback signal Vcomp reaches the enter-light-load mode threshold Vbi, and the load determining signal J1 turns to logic high. Then the switching mode power supply enters the light load working mode. Under the light load working mode, the feedback pulse signal P1 is blocked by the AND gate 3051, thus the normal load pulse signal PS1 keeps logic low, and the light load pulse signal P2 is provided as the on control signal Con. At time t2, the number of the pulses of the light load pulse signal P2 reaches 4, i.e., the light load pulse counting signal Cp2 reaches the light load pulse reference Vref2. Then the light load pulse regulating signal Pr1 flips to logic high, and the frequency regulating signal Fr1 increases followed by the decreasing of the charging current I1. As a result, the increasing rate of the capacitor voltage Vc1 slows down, and the frequency of the light load pulse signal P2 during time t2-t3 decreases. Meanwhile, the light load pulse regulating signal Pr1 resets the counting circuit 3042 via the OR gate 3041, and then the light load pulse counting signal Cp2 turns logic low. As a result, the light load pulse regulating signal Pr1 is logic low. At time t3, the number of the pulses of the light load pulse signal P2 reaches 4, i.e., the light load pulse counting signal Cp2 reaches the light load pulse reference Vref2 again. Then, the light load pulse regulating signal Pr1 flips to logic high, makes the frequency regulating signal Fr1 increase and the charging current of the current source I1 decrease. As a result, the frequency of the pulses of the light load pulse signal P2 further decreases. At time t3, the power provided by the switching mode power supply under light load working mode is not enough for the load, the feedback signal Vcomp increases. When the feedback signal Vcomp reaches the exit-light-load-mode threshold Vbo, the load determining signal J1 flips to logic low. Then the feedback pulse signal P1 passes the AND gate 3051 to be the normal load pulse signal PS1. The normal load pulse signal PS1 is superimposed upon the light load pulse signal P2 to generate the on control signal Con, which makes the switching mode power supply exit the light load working mode quickly. At time t4, the feedback signal Vcomp increases for the load and the output current Io increases. Then the frequency of the pulses of the feedback pulse signal P1 increases too. At time t5, the feedback signal Vcomp reaches the exit-light-load-mode threshold Vbo and the load determining signal J1 flips to logic low. Then during time t5-t6, the feedback pulse signal P1, i.e., the normal load pulse signal PS1, is superimposed upon the light load pulse signal P2 to generate the on control signal Con. At time t6, the output current Io increases again. At time t7, the feedback signal Vcomp increases to the exit-light-load-mode threshold Vbo again, and keeps larger than the exit-light-load-mode threshold Vbo hereafter, which means the switching mode power supply works under normal working mode. During this time, the frequency of the pulses of the normal load pulse signal PS1 increases, i.e., the pulse counting signal Cp3 increases to the normal load pulse reference Vref3, and then the comparator 3046 flips to provide the second reset signal Clr2 to reset the counting circuit 3044. As a result, the frequency regulating signal Fr1 is reset to the initial value before entering the light load working mode the next time. Meanwhile, the load determining J1 turns off the charging switch S1, and the current source I1 stops charging the capacitor C1. Then the light load pulse signal P2 stops pulsing, and the on control signal Con equals to the feedback pulse signal P1.

Figure 5:
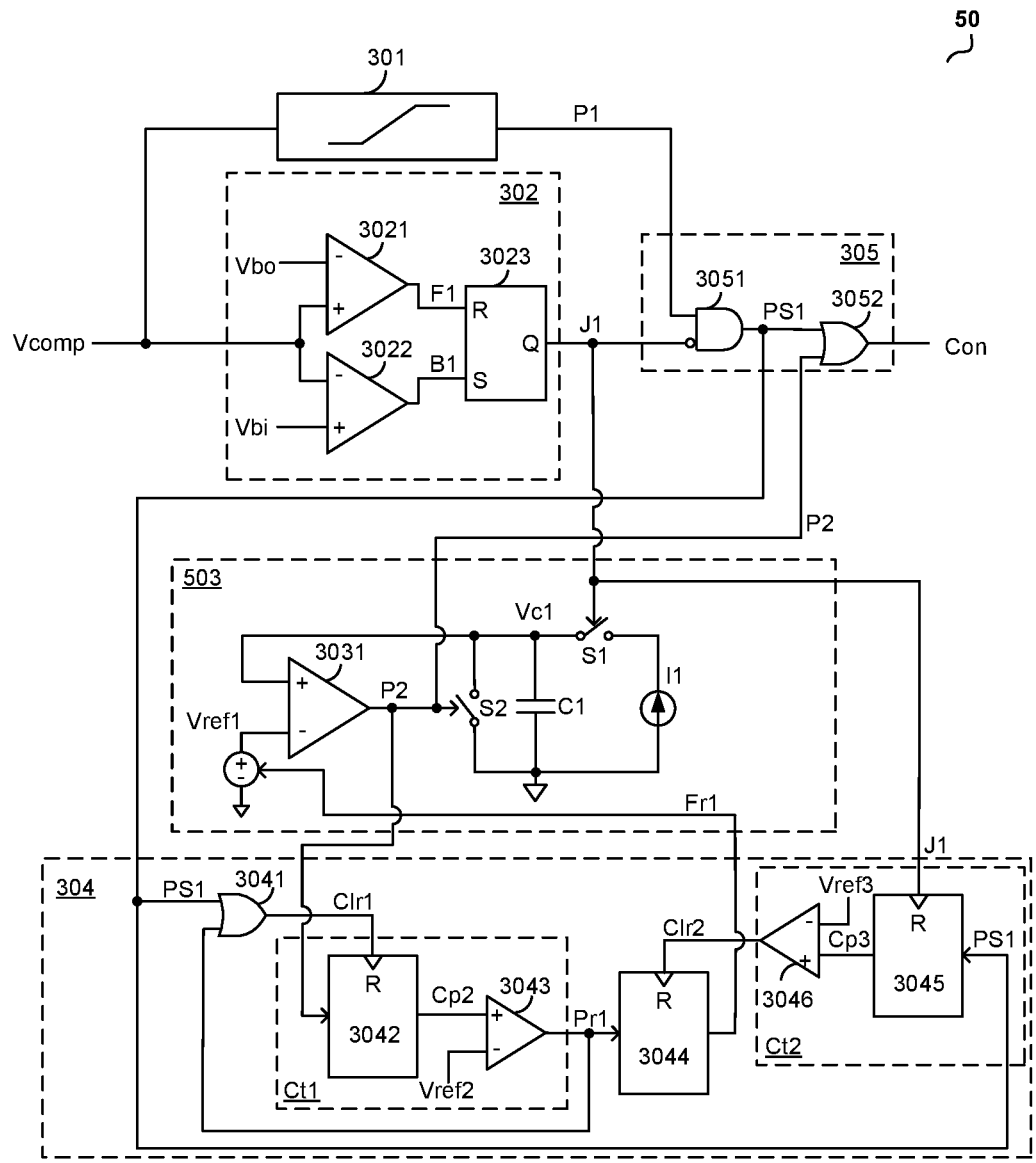
FIG. 5 schematically shows a control circuit 50 of a switching mode power supply in accordance with an embodiment of the present invention.

FIG. 5 schematically shows a control circuit 50 of a switching mode power supply in accordance with an embodiment of the present invention. The control circuit 50 is similar with the control circuit 30 in FIG. 3, the main difference is that, in control circuit 30, the frequency regulating signal Fr1 is adopted to regulate the charging current provided by the current source I1, thereby to regulate the frequency of the light load pulse signal P2, whereas in FIG. 5, the frequency regulating signal Fr1 is adopted to regulate the value of the light load pulse reference Vref1. In one embodiment, the light load pulse reference Vref1 increases as the frequency regulating signal Fr1 increases, which prolongs the time needed for the capacitor voltage Vc1 to reach the light load pulse reference Vref1, thereby to decrease the frequency of the light load pulse signal P2.

Figure 6:
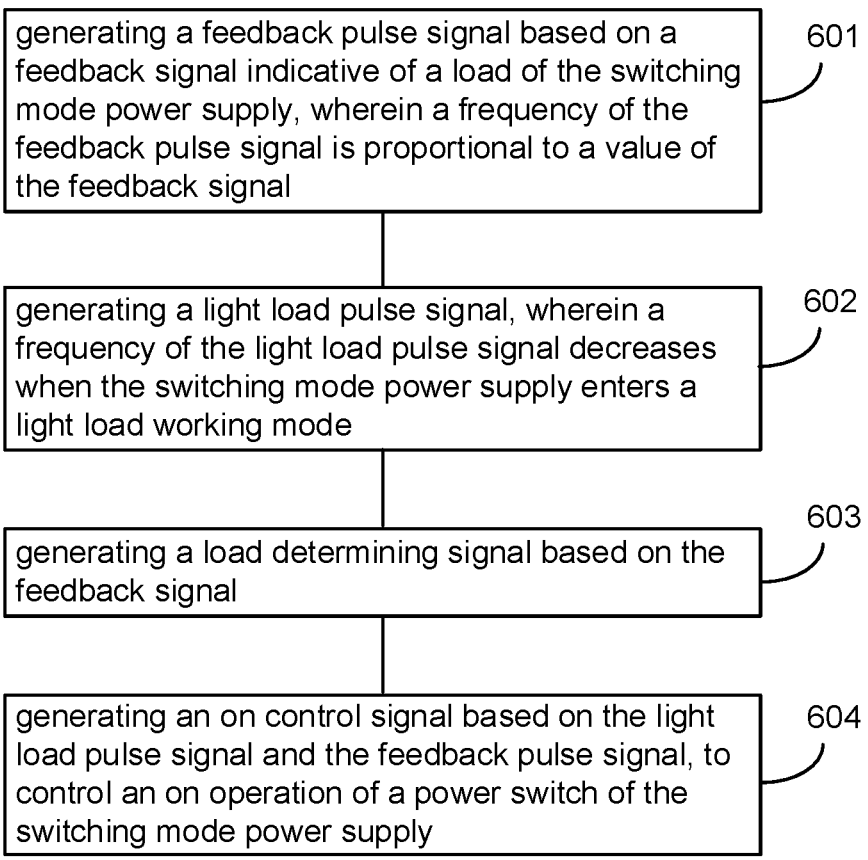
FIG. 6 shows a flow chart of a control method 60 for controlling a switching mode power supply in accordance with an embodiment of the present invention.

FIG. 6 shows a flow chart of a method 60 for controlling a switching mode power supply in accordance with an embodiment of the present invention. The switching mode power supply could be the flyback converter 10 in FIG. 1 and comprises a power switch configured to control the power conversion. It should be understood that the switching mode power supply in the present invention is not limited to the flyback converter, but comprises other topologies, e.g., buck, boost, buck-boost. The control method 60 is adopted to control the power switch of the switching mode power supply. As shown in FIG. 6, the control method 60 comprises steps 601-604 which are carried out without specific orders. Step 601, generating a feedback pulse signal based on a feedback signal representing a load condition of the switching mode power supply, wherein a frequency of the feedback pulse signal is proportional to a value of the feedback signal. Step 602, generating a light load pulse signal, wherein from when the switching mode power supply enters the light load working mode, the frequency of the light load pulse signal decreases. Step 603, generating a load determining signal based on the feedback signal, wherein when the feedback signal is lower than the enter-light-load mode threshold, the load determining signal indicates that the switching mode power supply works under light load working mode, and when the feedback signal is larger than the exit-light-load mode threshold, the load determining signal indicates that the switching mode power supply works under normal working mode. Step 604, generating an on control signal based on the light load pulse signal and the feedback pulse signal, to control the on operation of the power switch.

In one embodiment, the control method 60 further comprises step 605, generating an off control signal based on the feedback signal and an off threshold signal, to control the off operation of the power switch.

In one embodiment, the enter-light-load mode threshold is lower than the exit-light-load mode threshold.

In one embodiment, the frequency of the light load pulse signal is lower than the lower limit of the audible noise, i.e., 20 Hz.

In one embodiment, the frequency of the feedback pulse signal is higher than the upper limit of the audible noise, i.e., 20 kHz.

In one embodiment, the step 602 comprises: charging a capacitor by a current source to provide a capacitor voltage; generating a light load pulse signal based on a comparison result of the capacitor voltage and a light load pulse reference; discharging the capacitor in response to the pulses of the light load pulse signal; and stopping charging the capacitor when the load determining signal indicates that the switching mode power supply works under the normal working mode, wherein, a current provided by the current source decreases when the switching mode power supply enters the light load working mode.

In one embodiment, the step 602 comprises: charging a capacitor with a current source to provide a capacitor voltage; generating a light load pulse signal based on a comparison result of the capacitor voltage and a light load pulse reference; discharging the capacitor in response to the pulses of the light load pulse signal; and stopping charging the capacitor when the load determining signal indicates that the switching mode power supply works under normal working mode, wherein, a current provided by the current source increases when the switching mode power supply enters the light load working mode.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A control circuit of a switching mode power supply having a power switch, comprising:
    a feedback pulse circuit, configured to receive a feedback signal indicative of a load of the switching mode power supply, and to provide a feedback pulse signal based on the feedback signal;
    a load determining circuit, configured to receive the feedback signal, and to provide a load determining signal based on the feedback signal;
    a light load pulse circuit, configured to receive the load determining signal and a frequency regulating signal, and to provide a light load pulse signal based on the load determining signal and the frequency regulating signal;
    a selecting circuit, configured to receive the load determining signal, the feedback pulse signal and the light load pulse signal, and to provide an on control signal based on the load determining signal, the feedback pulse signal and the light load pulse signal; wherein the on control signal controls an on operation of the power switch;
    a frequency regulating circuit, configured to receive the load determining signal, the light load pulse signal and a normal load pulse signal, and to provide the frequency regulating signal based on the load determining signal, the light load pulse signal and the normal load pulse signal; wherein the normal load pulse signal is generated based on a logic operation to the feedback pulse signal and the load determining signal;
    an off control circuit, configured to receive the feedback signal and an off threshold signal, and to provide an off control signal based on the feedback signal and the off threshold signal; and
    a driving logic circuit, configured to receive the on control signal and the off control signal, and to provide a power control signal based on the on control signal and the off control signal, for controlling the power switch; wherein
    the frequency regulating circuit comprises:
       a logic gate circuit, configured to receive the normal load pulse signal and a light load pulse regulating signal, and to provide a first reset signal based on a logic operation to the normal load pulse signal and the light load pulse regulating signal;
       a first counting control circuit, configured to receive the first reset signal and the light load pulse signal, and to provide the light load pulse regulating signal based on the first reset signal and the light load pulse signal;
       a second counting control circuit, configured to receive the load determining signal and the normal load pulse signal, and to provide a second reset signal based on the load determining signal and the normal load pulse signal; and
       a counting circuit, configured to receive the second reset signal and the light load pulse regulating signal, and to provide the frequency regulating signal based on the second reset signal and the light load pulse regulating signal; and
    wherein the selecting circuit comprises:
    an AND gate, configured to receive the feedback pulse signal and the load determining signal, and to provide a normal load pulse signal; and
    an OR gate, configured to receive the normal load pulse signal and the light load pulse signal, and to provide the on control signal.

2. The control circuit of claim 1, wherein a frequency of the feedback pulse signal is proportional to a value of the feedback signal, and the value of the feedback signal is proportional to the load of the switching mode power supply.

3. The control circuit of claim 1, wherein the feedback pulse circuit comprises a voltage-frequency converting circuit.

4. The control circuit of claim 1, wherein the load determining circuit comprises:
    an exit-light-load-mode comparator, having a first input terminal configured to receive an exit-light-load-mode threshold, a second input terminal configured to receive the feedback signal, and an output terminal configured to provide an exit-light-load-mode setting signal based on a comparison result of the exit-light-load-mode threshold and the feedback signal;
    an enter-light-load-mode comparator, having a first input terminal configured to receive the feedback signal, a second input terminal configured to receive an enter-light-load-mode threshold, and an output terminal configured to provide an enter-light-load-mode setting signal based on a comparison result of the enter-light-load-mode threshold and the feedback signal; and
    an RS flip-flop having a set terminal configured to receive the enter-light-load-mode setting signal, a reset terminal configured to receive the exit-light-load-mode setting signal, and an output terminal configured to provide the load determining signal.

5. The control circuit of claim 1, wherein the light load pulse circuit comprises:
    a current source;
    a capacitor, charged by the current source, wherein the capacitor provides a capacitor voltage; and
    a light load pulse comparator, having a first input terminal configured to receive the capacitor voltage, a second input terminal configured to receive a light load pulse reference, and an output terminal configured to provide the light load pulse signal based on a comparison result of the capacitor voltage and the light load pulse reference.

6. The control circuit of claim 5, wherein a current provided by the current source is controlled by the frequency regulating signal.

7. The control circuit of claim 5, wherein the light load pulse reference is controlled by the frequency regulating signal.

8. A switching mode power supply, comprising:
    a power switch; and
    a control circuit, configured to provide an on control signal for controlling an on operation of the power switch, wherein the control circuit comprises:
       a feedback pulse circuit, configured to receive a feedback signal indicative of a load of the switching mode power supply, and to provide a feedback pulse signal based on the feedback signal;
       a load determining circuit, configured to receive the feedback signal, and to provide a load determining signal based on the feedback signal;
       a light load pulse circuit, configured to receive the load determining signal and a frequency regulating signal, and to provide a light load pulse signal based on the load determining signal and the frequency regulating signal;

a selecting circuit, configured to receive the load determining signal, the feedback pulse signal and the light load pulse signal, and to provide the on control signal based on the load determining signal, the feedback pulse signal and the light load pulse signal;

a frequency regulating circuit, configured to receive the load determining signal, the light load pulse signal and a normal load pulse signal, and to provide the frequency regulating signal based on the load determining signal, the light load pulse signal and the normal load pulse signal;

an off control circuit, configured to receive the feedback signal and an off threshold signal, and to provide an off control signal based on the feedback signal and the off threshold signal; and a driving logic circuit, configured to receive the on control signal and the off control signal, and to provide a power control signal based on the on control signal and the off control signal, for controlling the power switch; wherein the frequency regulating circuit comprises:
- a logic gate circuit, configured to receive the normal load pulse signal and a light load pulse regulating signal, and to provide a first reset signal based on a logic operation to the normal load pulse signal and the light load pulse regulating signal;
- a first counting control circuit, configured to receive the first reset signal and the light load pulse signal, and to provide the light load pulse regulating signal based on the first reset signal and the light load pulse signal;
- a second counting control circuit, configured to receive the load determining signal and the normal load pulse signal, and to provide a second reset signal based on the load determining signal and the normal load pulse signal; and
- a counting circuit, configured to receive the second reset signal and the light load pulse regulating signal, and to provide the frequency regulating signal based on the second reset signal and the light load pulse regulating signal; and wherein
the selecting circuit comprises:
- an AND gate, configured to receive the feedback pulse signal and the load determining signal, and to provide a normal load pulse signal; and
- an OR gate, configured to receive the normal load pulse signal and the light load pulse signal, and to provide the on control signal.

* * * * *